United States Patent [19]

Huvers

[11] 3,899,048
[45] Aug. 12, 1975

[54] SELECTIVE BRAKING ASSEMBLY

[76] Inventor: Marius E. Huvers, 480 Carre du Gue, Sainte Therese, Quebec, Canada

[22] Filed: Sept. 17, 1973

[21] Appl. No.: 398,005

[52] U.S. Cl. .................................. 188/16; 180/82 R
[51] Int. Cl.² ........................................... B60T 1/00
[58] Field of Search ........ 180/6.2, 82 R, 76; 188/16

[56] References Cited
UNITED STATES PATENTS

| | | | |
|---|---|---|---|
| 1,334,345 | 3/1920 | Bilqere | 188/16 |
| 1,736,082 | 11/1929 | Houseman | 188/16 |
| 3,253,672 | 5/1966 | Mikina | 180/76 X |
| 3,792,746 | 2/1974 | Phillips | 180/82 R |

FOREIGN PATENTS OR APPLICATIONS

| | | | |
|---|---|---|---|
| 1,124,637 | 2/1956 | France | 180/6.2 |

Primary Examiner—David Schonberg
Assistant Examiner—John A. Pekar

[57] ABSTRACT

Braking assemblies adapted, according to different embodiments, to be associated to traction wheels which are driven by a differential gear drive to differentially and selectively brake on slipping wheel to cause more torque to be transmitted to the other wheel to produce traction by the latter. Such braking assembly includes a pair of brake actuating links adapted to actuate the braking mechanisms respectively of the traction wheels, a common brake actuation mechanism connected to the brake actuating links and arranged to simultaneously actuate both braking mechanisms for simultaneous braking of both wheels and a reciprocatively displaceable actuation device operatively connected to produce actuation of only one of the brake actuating links to selectively brake only the corresponding wheel for increased torque on the other wheel through the differential gear drive.

7 Claims, 28 Drawing Figures

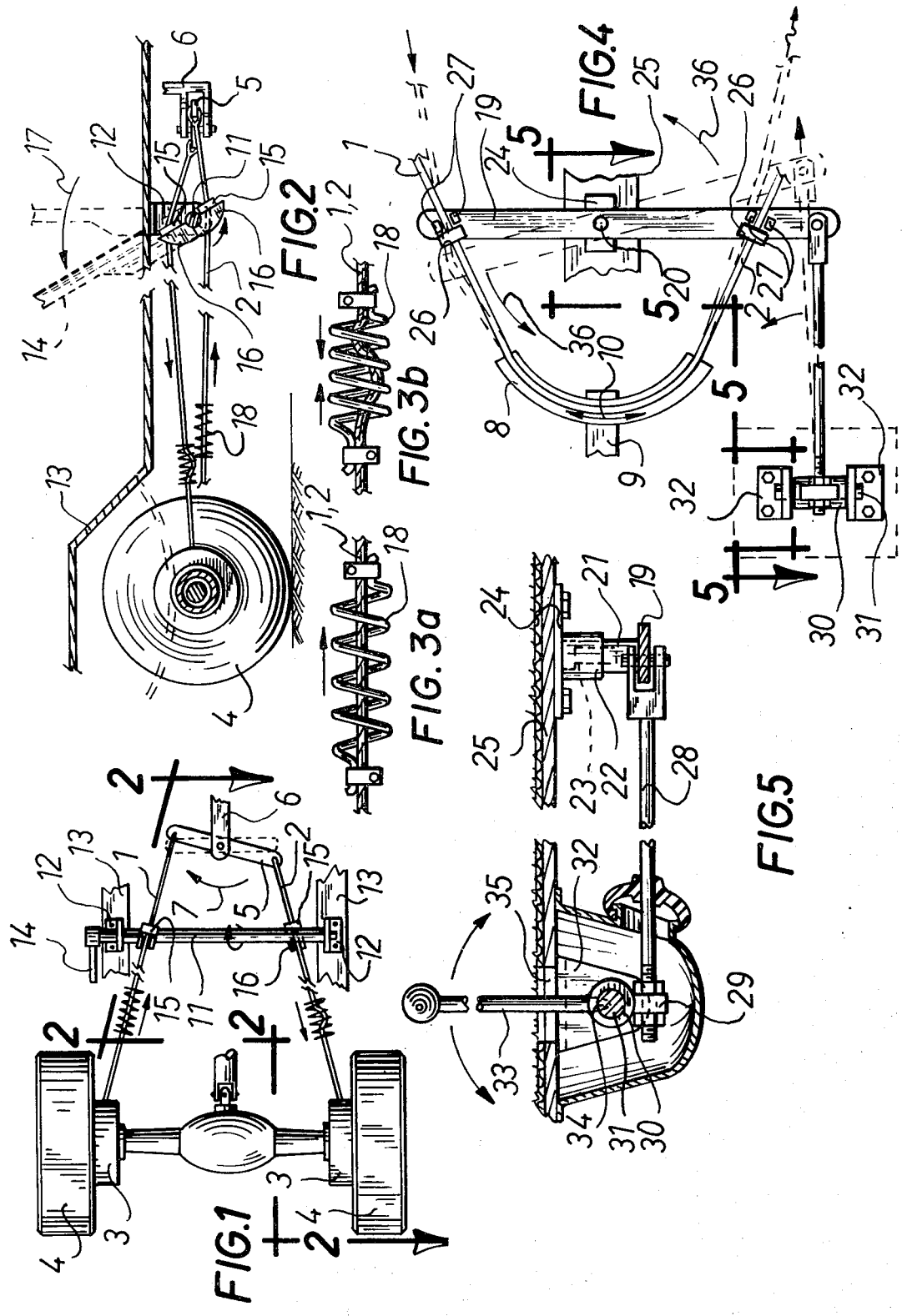

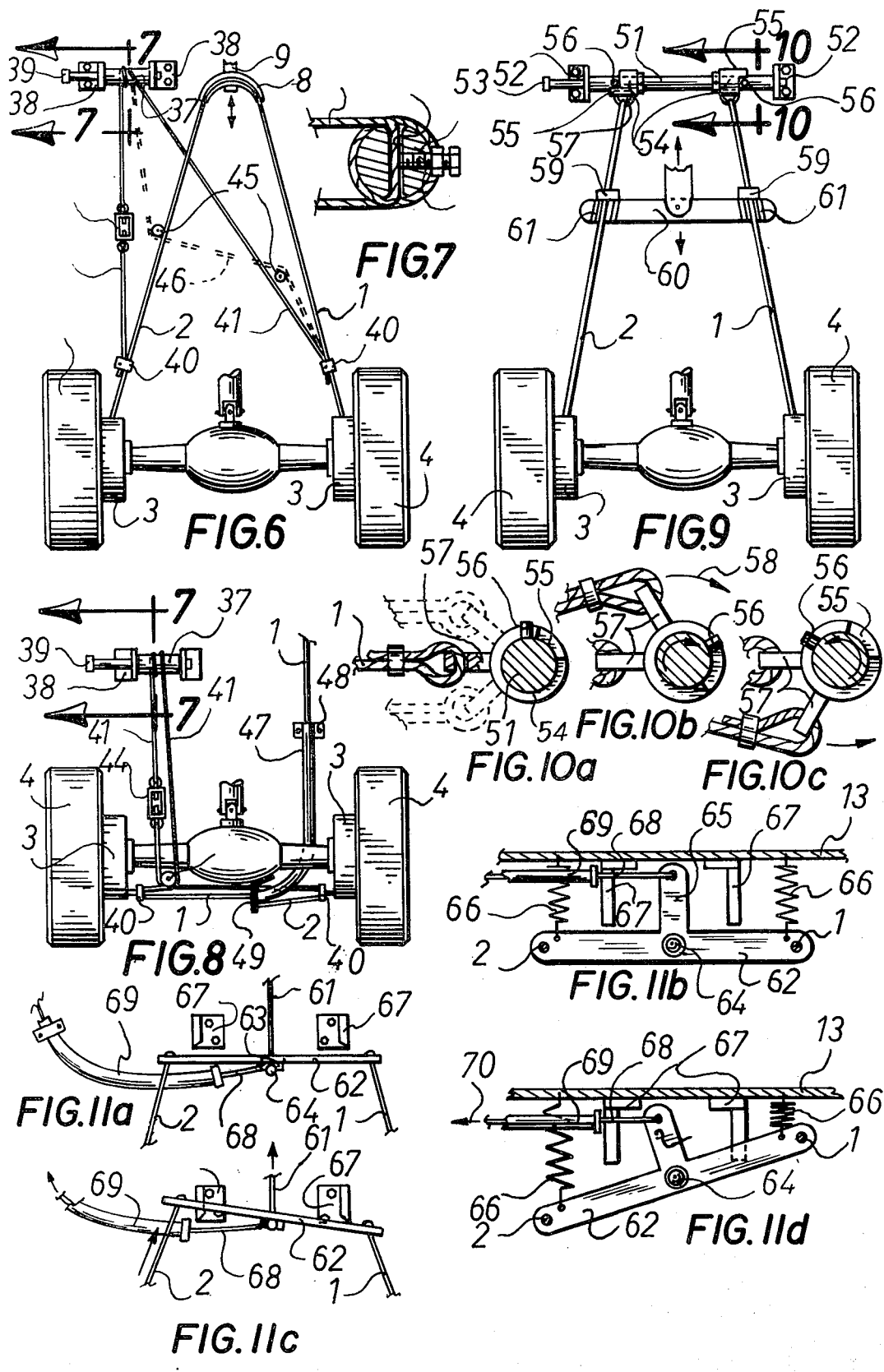

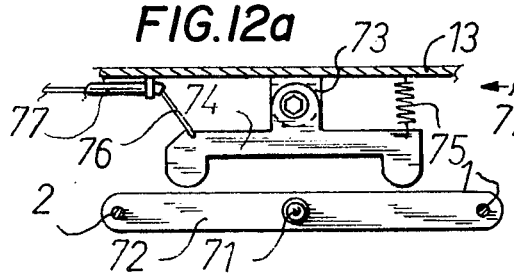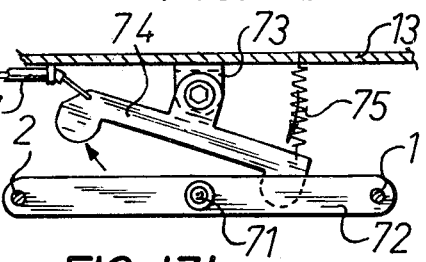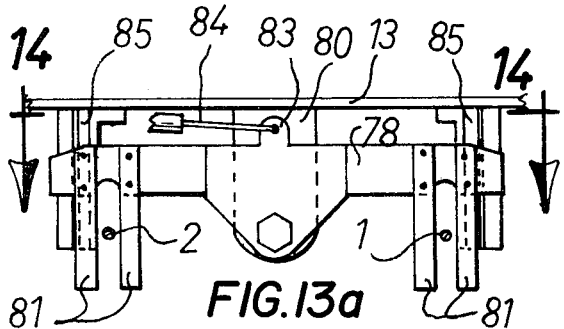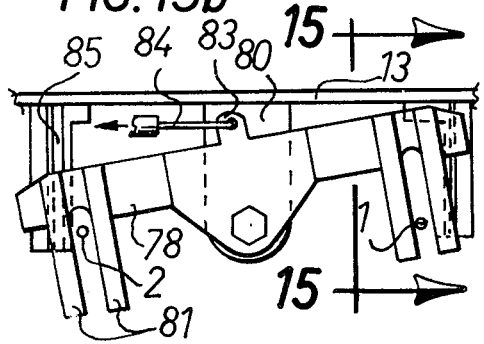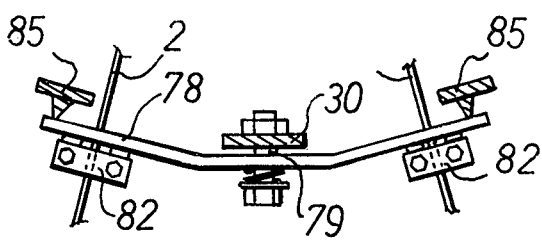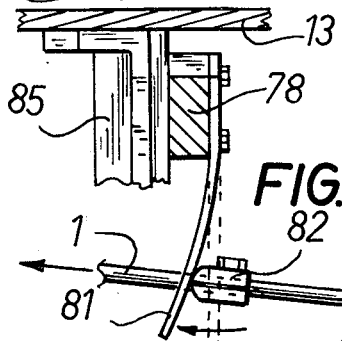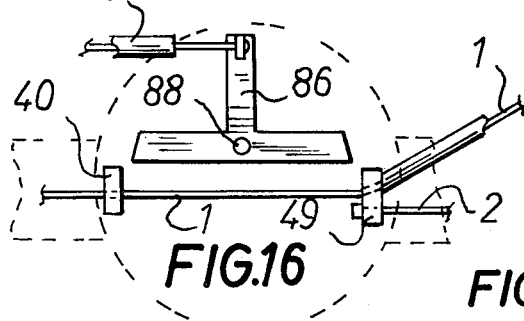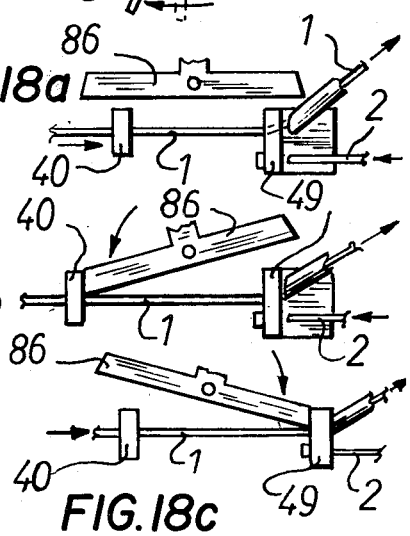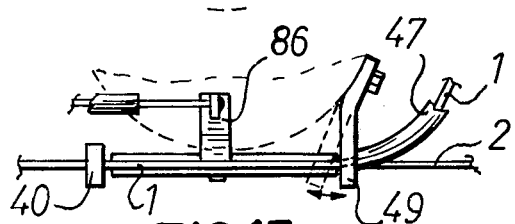

SELECTIVE BRAKING ASSEMBLY

This invention relates to braking assemblies for traction wheels, and more particularly, to braking assemblies for traction wheels of the type which are drivingly connected to a differential gear drive.

In many occasions such as on ice, snow, mud, sand, or the like, a vehicle refuses to move since one traction wheel thereof freely spins or slips without exerting any significant traction while the other wheel does not rotate since the differential gear drive of the vehicle then transmits insufficient torque thereto.

It is a general object of the invention to provide for traction wheels of the above type, braking assemblies adapted to selectively brake only such free spinning wheel to cause sufficient torque of the differential gear drive to be transmitted to both traction wheels for increased traction of the vehicle on ice, snow, mud, sand or the like.

It is another general object of the invention to provide for a pair of traction wheels of the above type, selective braking assemblies adapted to produce selective differential braking of one traction wheel relative to the other whereby to prevent free rotation of the spinning traction wheel and to transmit more torque to both traction wheels.

It is a further object of the invention to provide for traction wheels of the above type, braking assemblies which are adapted to be formed in combination with existing conventional parking brake assemblies to allow mere conversion of the latter using the appropriate elements according to the present invention.

The above and other objects and advantages of the invention will be better understood in the light of the following detailed description of different embodiments thereof which are illustrated by way of example, in the accompanying drawings, in which:

FIG. 1 is a bottom plan view of traction wheels and a selective braking assembly connected thereto according to a first embodiment of the invention.

FIG. 2 is a cross-sectional view as seen along line 2—2 in FIG. 1.

FIGS. 3a and 3b are sequential side views of a spring tensioner forming part of the embodiment of FIGS. 1 and 2.

FIG. 4 is a bottom plan view of a selective braking assembly, according to a second embodiment of the invention.

FIG. 5 is a cross-sectional view as seen along line 5—5 in FIG. 4.

FIG. 6 is a plan view of traction wheels and a selective braking assembly associated thereto according to a third embodiment of the invention.

FIG. 7 is a cross-sectional view as seen along line 7—7 in FIG. 6.

FIG. 8 is a plan view of traction wheels and a selective braking assembly connected thereto according to a fourth embodiment of the invention.

FIG. 9 is a bottom plan view of traction wheels and a selective braking assembly connected thereto according to a fifth embodiment of the invention.

FIGS. 10a, 10b, and 10c, are sequential cross-sectional views as seen along line 10—10 in FIG. 9.

FIGS. 11a and 11b are a bottom plan view and a rear view of a selective braking assembly according to a sixth embodiment of the invention.

FIGS. 11c and 11d are views similar to the views of FIGS. 11 but wherein the selective braking assembly has been actuated for selective differential braking.

FIGS. 12a, and 12b, are elevation views of a selective braking assembly according to a seventh embodiment of the invention.

FIGS. 13a, and 13b, are end elevation views of a differential braking assembly according to an eighth embodiment of the invention.

FIG. 14 is a cross-sectional plan view as seen along line 14—14 in FIG. 13a.

FIG. 15 is a cross-sectional view as seen along line 15—15 in FIG. 13, view b.

FIG. 16 is an elevation view of a selective braking assembly according to a ninth embodiment of the invention.

FIG. 17 is a plan view of the assembly of FIG. 16.

FIGS. 18a, 18b, and 18c, are cross-sectional views of the assembly of FIGS. 16 and 17 shown in three different positions of actuation.

In many cars, in particular in American-built cars, the conventional parking brake assembly includes an equalizing yoke member to allow equal braking force to be applied on opposite sides of a vehicle. Therefore, in this instance, the parking brake assembly according to the prior art, includes a pair of brake cable sections 1 and 2 connected at one end, in any known manner, to the corresponding conventional braking mechanism, not shown, housed into a brake drum 3 of a traction wheel 4.

As shown in FIGS. 1 and 2, according to one embodiment of the prior art, the equalizing member constitutes a lever 5 pivoted at its middle onto the rear end of a common actuation pull rod or cable 6. The other or front end of the brake cable sections 1 and 2 are attached to the opposite ends of the equalizing member 5 to be pulled by the latter. The common actuation pull rod or cable 6 is connected at its forward end, not shown, to be actuated by the parking brake pedal or handle, as the case may be.

There results that simultaneous braking on both sides of a vehicle may thus be obtained by actuation of the pull element 6 which pulls on both cable sections 1 and 2. The equalizing lever 5 may pivot, such as in the direction of the arrow 7 in FIG. 1, to ensure equal braking forces on both brake mechanisms.

According to another embodiment of the prior art the equalizing member, instead of being a lever 5 as in FIGS. 1 and 2, constitutes a channel member or curved yoke 8 having a single brake cable including the sections 1 and 2, slidably engaging the same. A pull element 9 of suitable construction engages the curved yoke 8 to pull thereon and onto the brake cable sections 1 and 2. As is well known, in this and other embodiments the equalization is produced by sliding of the brake cable longitudinally in the curved yoke 8, as indicated by the arrow 10 in FIG. 4, or rotation of yoke 8.

The first embodiment of the invention illustrated in FIGS. 1,2, and 3 will now be described in details. A rod 11 extends transversely of the brake cable sections 1 and 2 and is thus pivotally secured by a pair of brackets 12 fixed against the underside of the floor or beams 13 of the body of a vehicle having the traction wheels 4. The transverse rod 11 is reciprocatively rotatable and a handle 14 is securable to the rod 11 to thus rotate the latter. Preferably, the handle 14 is conveniently arranged to be accessible to the driver of the vehicle either through the floor of the latter or outside upon opening the door of the vehicle.

A clamp or block 15 is fixedly secured to each brake cable section 1 and 2 adjacent to the reciprocatively rotatable rod 11. A pair of abutment members 16 are secured to the rod 11 and project radially therefrom adjacent to the clamps 15 respectively. The abutments 16 thus project in diametrically opposite relationship relative to the rod 11 for circumferential abutment with one or the other of the clamps 15 depending on the direction of rotation of the rod 11. Thus one or the other of the brake cable sections 1 and 2 may be selectively pulled away from the traction wheels, by actuation of the differential braking actuation lever 14. For instance, as shown in FIG. 2, when the handlever 14 is pivoted rearwardly in the direction of the arrow 17, the brake cable section 2 is pulled and the brake cable section 1 is slackened.

A tension spring 18 is clamped at its opposite ends to each cable section 1 and 2 and thereby is arranged to contract, as shown in FIG. 3b, to take up the slack that is produced in the corresponding brake cable section.

In the second embodiment illustrated in FIGS. 4 and 5, a differential braking lever 19 extends transversely of the brake cable sections 1 and 2. The reciprocatively rotatable lever 19 is pivotally mounted at its middle by a pivot 20 supported by a stud 21 held into a mounting sleeve 22 by a screw 23. The sleeve is integrally formed with a flange 24 which is secured against the underside of the floor 25 of a vehicle. A clamp or block 26 is secured to each brake cable section 1 and 2 adjacent the opposite ends of the reciprocatively rotatable lever 19. A pair of studs or projections 27 are secured at each end of the lever 19 and arranged to form an abutment for the adjoining clamp or block 26.

A differential actuation push-pull rod 28 is pivotally connected at one end to one end of the reciprocatively rotatable lever 19 and is engaged at its other end through a radial lug 29 integral with a sleeve 30. The latter is engaged over a pin 31 pivotally carried by brackets 32. A pair of nuts loosely hold the push rod 28 into the radial lug 29. A handle or handlever 33 has a tapered end 34 adapted to engage into a complementarily shaped radial hole into the sleeve 30 and a pin 31. The handle or handlever 33 is removably insertable in this radial hole through a suitable aperture 35 into the floor 25 of a vehicle.

In order to differentially brake one traction wheel 4 relative to the other which is driven by the same differential gear drive, the handlever 33 is engaged into the tapering hole in the sleeve 30 and the pivot pin 31. Thereafter the handlever 33 is pivoted about the axis defined by the pivot pin 31 to rotate the lever 19 in the selected direction.

There results a rotation of the lever 19 say in the direction of the arrows 36 and a pulling of the brake cable section 1 by engagement of the abutment 27 against the clamp 26 of the brake cable section 1.

The antislip braking assembly according to a third embodiment of the invention, illustrated in FIGS. 6 and 7, will now be described in details with particular reference to these figures. As in the second embodiment, the brake cable sections 1 and 2 form a single cable pulled by a curved yoke 8 actuated by a pull element 9. Obviously, an equalizing lever 5 and the related connections may be used as well and interchangeably with the equalizing curved yoke 8.

A roller 37 is rotatably mounted against the underside of the floor of a vehicle by a pair of brackets 38. A handle 39 is securable to one end of the roller 37 to reciprocatively rotate the latter. The handle 39 may for instance be made readily accessible to the driver of the vehicle through the floor of the latter, as the handle 33 in the second embodiment, or near the door outside the vehicle. A pair of clamps 40 are fixedly secured to the brake cable sections 1 and 2 respectively and an actuation cable 41 is secured at its opposite ends to the clamps 40 and wound around the roller 37 to be selectively pulled by rotation of the latter. The cable 41 is secured to the roller 37 by looping around the same, through diametrical bore 42 thereof, and by a set screw 43. A turnbuckle 44 is preferably provided to adjust the tension into the actuation cable 41. As shown by the pulleys 45 and the dotted lines 46 in FIG. 6, the actuation cable 41 may be conveniently diverted around obstacles under the floor of a vehicle.

As may be easily understood, the differential braking of the slipping wheel may be done by appropriate rotation of the roller 37 to pull on the corresponding clamp 40 and brake cable section 1 or 2.

The antislip braking assembly according to a fourth embodiment of the invention, illustrated in FIGS. 7 and 8, includes, as the preceding third embodiment, the roller 37, brackets 38, handle 39, clamps 40, actuation cable 41, bore 42, set screw 43, and turnbuckle 44. However, in this case these elements are operatively connected to a parking brake assembly as used on some Japanese cars. Such parking brake assembly includes a brake cable section 1 extending through a flexible sheathing 47 and operatively connected to the braking mechanism inside one brake drum or casing 3. One end of the flexible sheathing 47 is fixedly secured relative to the vehicle body by means of a bracket 48 or any suitable expedient. A flexible and resilient plate 49 is secured to the housing of the differential gear drive and rearwardly projects therefrom. The other end of the flexible sheathing 47 is secured to the resilient plate 49 in endwise abutment against the latter. The brake cable section 2 is attached at one end to the resilient plate 49 and at the other end to the corresponding breaking assembly of the other brake drum 3. A pulley 50 is provided to guide the free ends of the actuation cable 41 for parallel actions of these free ends with the brake cable sections 1 and 2 to which they are secured by the clamps 40.

As known in the prior art, simultaneous braking of both tractionwheels 4 is produced by pulling on the brake cable section 1 causing a reaction of the latter onto the sheathing 47 which tends to straighten the latter thereby displacing the resilient plate 49 to the left, as seen in FIG. 8. There also results pulling on the brake cable section 2. To produce differential braking, the reciprocatively rotatable roller 37 is selectively rotated by the handle 39 producing a pull on the appropriate clamp 40 and brake cable section 1 or 2.

The antislip braking assembly according to the fifth embodiment of the invention illustrated in FIGS. 9 and 10, forms a novel parking brake assembly particularly adapted to combine differential braking therewith. In this embodiment, the reciprocatively rotatable member forms a rod 51 extending transversely of the brake cable sections 1 and 2 and rotatably supported by a pair of brackets 52 secured against the underside of the floor of a vehicle, not shown. A handle 53, such as the handle 39, is securable to the rod 51 to selectively and reciprocatively rotate the latter.

A pair of shackles 54 are rotatably engaged over the rod 51 for rotation of the latter therein. Each shackle 54 is formed with an axial projection portion 55 arranged for circumferential abutment of an associated pin 56 fixed to rod 51. Each shackle 54 forms a radial lug or arm 57 to which is attached one end of the corresponding brake cable section 1 or 2. It must be noted that the radial pins 56 are arranged on opposite sides respectively of the axial projections 55 circumferentially of the rod 51 such that rotation of the latter in any one direction will cause rotation of one shackle 54 only in that direction by engagement of the corresponding pin 56 therewith.

Referring now to FIGS. 10a, 10b, and 10c, if the rod 51 is rotated clockwise, the pin 56 on the right in FIG. 9 engages the corresponding shackle 54 and thus rotates the latter, as shown by the arrow 58 in FIG. 10b. For the opposite rotation of the rod 51, the left pin 56 rotates the corresponding shackle 54. Such rotation of any shackle 54 produces by the action of the radial lug 57, a pulling on the corresponding brake cable sections 1 or 2. It must be noted that the response of the brake cable sections 1 and 2 to the rotation of the shackles may be increased by arranging the radial lugs 57 such that they rest inoperatively inclined relative to the direction of the cable sections 1 and 2, as shown in dotted lines in FIG. 10a.

To provide for common actuation of both braking mechanisms, a clamp 59 is fixed to each brake cable section 1 and 2 and an equalizing lever 60 is arranged to extend transversely of the brake cable sections 1 and 2. An abutment 61 is secured onto each end of the lever 60 and arranged for engagement with the corresponding clamp 59 to pull on the corresponding brake cable section 1 or 2 and to produce simultaneous actuation of both brake mechanisms upon pulling away on the common actuation lever 60.

A sixth embodiment of the invention is illustrated in FIGS. 11a to 11d inclusive. This selective braking assembly includes a common actuation pulling link portion 61a provided to move longitudinally under the floor 13 of a vehicle and connected to be actuated by the parking brake control of the vehicle. A lever 62 is pivoted at its middle portion onto the link portion 61a. The lever 62 besides being pivoted about the link portion 61 is also pivoted relative to the latter by a socket 63 engaging against a ball 64 on the end of the link portion 61a. The brake cable sections 1 and 2 are adjustably attached to the opposite ends of the lever 62 and extend away therefrom on the opposite side thereof relative to the link portion 61a, and lengthwise of the latter. The lever 62 has a lateral projection 65 extending upwardly toward the floor 13 of the vehicle. A pair of springs 66 are hooked to the opposite ends respectively of the lever 62 and at their other end to the floor 13 to bias the lever toward an equilibrium position, as shown in FIG. 11, view c. A pair of brackets 67 are secured against the underside of the floor 13, laterally spaced from the link portion 61a. These brackets 67 project downwardly from the floor 13, in front of lever 62, on the same side as the link portion 61a. A bowden cable 68 is attached to the free end of the lateral lever projection 65 to reciprocatively pivot the lever 62 about the link portion 61a. For this purpose, the cable 68 has a rigid straight outer end slidably engaged into a suitable straight end 69 of the sheathing which otherwise projects toward the front, as the common actuation cable to which the link portion 61 is secured.

In normal operation, the lever 62 is held as in FIG. 11b, and both traction wheels may be braked by pulling on the link portion 61a. In such case, the lever is pulled forwardly and passes under both abutments or brackets 67. However, when it is desired to brake a slipping traction wheel, the bowden cable 68 is correspondingly either pulled or pushed. Let us say the cable 68 is pulled in the direction of the arrow 70, as shown in FIG. 11d. Then, the left wheel only may be braked by pulling on the link portion 61a resulting in abutment of the right end of the lever 62 against the abutment bracket 67 on the right side and thus pulling on the brake cable section 2 only.

The seventh embodiment of the invention defines an antislip braking assembly which is shown in FIGS. 12a and 12b. In this case as well as in the sixth embodiment, the concept consists in blocking one end of a member such as to prevent pulling on the brake cable section attached to that same end. This assembly thus includes a common actuation cable having a ball 71 at the end and a lever 72 is pivoted at its middle about the common actuation cable which extends therethrough with the ball 71 engaging against the rear side thereof. The brake cable sections 1 and 2 are adjustably attached to the opposite ends respectively of the lever 72. A bracket 73 is secured against the underside of the floor 13 of a vehicle and defines a pivot axis extending lengthwise of and overlying the common actuation cable of which only the ball 71 is shown. A differential actuation lever 74 is sturdily pivoted on the bracket 73 about the pivot axis defined by the latter. The opposite ends of the lever 74 are arranged to selectively engage ahead of the lever 72 to intercept or block either of the two ends of the latter, for instance as shown in FIG. 12b. A tension spring 75 is attached to one end of the lever 74 to bias the latter toward the normal equilibrium position of FIG. 12a. A bowden cable 76 having a sheathing 77 is attached to the lever 74 to reciprocatively rotate or pivot the latter to effect differential braking.

The selective braking assembly according to the eighth embodiment of the invention is illustrated in FIGS. 13a, and 13b, 14 and 15 includes a lever 78 pivoted at its middle onto a pin 79 extending transversely therethrough and carried by a bracket 80 secured against the underside of the floor 13 of the vehicle and extending therefrom. The lever 78 extends transversely between the brake cable sections 1 and 2. A pair of resilient blades 81 are secured in spaced apart relationship at each end of the lever 78 to define an upward slot between them into which extends the corresponding brake cable section 1 or 2. As shown in FIG. 15, the blades 81 are resiliently bendable forwardly. A clamp 82 is fixedly secured to each brake cable section 1 and 2 on the rear side of the resilient blades 81 such as to engage the latter upon forward pulling on these brake cables sections. A lug 83 projects upwardly from the upper edge of the lever 78 and a bowden cable 84 is connected to this lug 83 and projects lengthwise of the lever 78 to reciprocatively pivot the latter about the pivot 79. An abutment 85 is located at each end of the lever 78 and on the forward side of the latter and fixed to the underside of the floor 13 of the vehicle.

In the normal position shown in FIG. 13a, both brake cable sections 1 and 2 are at the same distance along the resilient blades 81 such that a pull on both cable sections produce equal bending of the resilient blades and equal actuation of the braking mechanisms of both rear wheels. However, selective braking of only one rear traction wheel is obtained by appropriate actuation of the bowden cable 84 causing pivoting of the lever 78. Thus, the lower pair of resilient blades 81 are engaged by the corresponding clamp 82 nearer the lever 78 and prevent actuation of the corresponding braking mechanism on that side of the vehicle.

The antislip braking assembly according to the ninth embodiment of the invention, illustrated in FIGS. 16, 17 and 18, a, b and c, is particularly adapted for use in combination with the aforementioned parking brake assembly of some Japanese cars. As in the embodiment of FIG. 8, a clamp 40 is secured to the brake cable section 1 and the brake cable section 2 is attached to a resilient plate 49 secured to the housing of the differential gear drive. The sheathing 47 is secured to the resilient plate 49 to deflect the latter.

A differential actuation lever 86 is reciprocatively pivotable by a bowden cable 87 about a pivot 88, fixed to the differential housing. The lever 86 has opposite ends arranged to selectively engage the adjacent clamp 40 or the resilient member 49.

When the lever 86 rests in the intermediate position as in FIG. 18a, both brake cable sections 1 and 2 operate normally to apply the parking brake on both sides of the vehicle. When it is desired to provide differential braking, the lever 86 is selectively pivoted to one or the other of the positions of FIGS. 18a, 18b and 18c. In the position of FIG. 18b, the clamp 40 abuts against the lowered end of the lever 86 such that pulling on the brake cable section 1 does not apply the brake connected thereto, but produces straightening of the sheathing 47 and thus pulling on the brake cable section 2 by flexing of the resilient plate 49. The reverse operation is illustrated in FIG. 18c. Thus selective braking of only one rear or traction wheel 4 is obtained.

The antislip braking assemblies which have been described so far are all of the mechanical type using mechanical links to actuate the associated braking mechanisms. However, the principle of the invention is also applicable to the hydraulic braking system by inserting an hydraulic differential actuation device along the hydraulic brake line which operatively links the usual dual master cylinder to the braking mechanisms of the traction wheels.

What I claim is:

1. A vehicle comprising a floor, a differential gear drive, a pair of traction wheels drivingly connected to said differential gear drive on opposite sides thereof, a pair of braking mechanisms connected to said pair of traction wheels respectively, a common braking assembly, a selective braking assembly separately addable to said common braking assembly, the latter including a pair of brake actuating links connected to said pair of braking mechanisms respectively, and a common actuation mechanism operatively connected to said pair of brake actuating links and constructed and arranged to produce simultaneous actuation of the latter and of said braking mechanisms, said selective braking assembly being entirely secured under said floor and including a reciprocatively rotatable member, a hand lever, and a pair of differential braking links extending entirely under said floor and operatively connected to said brake actuating links respectively and to said reciprocatively rotatable member for opposite reciprocating movement and differentially actuating said brake actuating links in response to rotation of said reciprocatively rotatable member, the latter being secured under said floor and having an axis of rotation projecting transversely of the vehicle, and said hand lever projecting upright through said floor, engaging said operatively rotatable member, and producing fore and aft pivotal reciprocation of the latter about said axis of rotation thereof.

2. A vehicle as defined in claim 1, wherein each of said brake actuating links includes a brake cable section, lateral projection means is fixedly secured onto each of said brake cable sections and said differential braking links form a pair of abutments secured onto said reciprocatively rotatable member adjacent said lateral projection means respectively and arranged to selectively engage and pull on either one of the latter upon said corresponding rotation of said rotatable member.

3. A vehicle as defined in claim 2, wherein said reciprocatively rotatable member defines an axis of rotation thereof, said brake cable sections extend in spaced apart relationship on opposite sides of said axis of rotation and transversely thereto, each of said lateral projection means includes a clamp fixedly secured onto the corresponding one of said brake cable sections and positioned substantially diametrically of the other of said clamps relative to said axis, and said pair of abutments are substantially diametrically spaced onto the axis thereof and arranged on the same opposite side of said clamps relative to said common actuation mechanism along the length of said brake cable sections.

4. A vehicle as defined in claim 3, wherein said reciprocatively rotatable member forms a rod rotatable about a longitudinal axis thereof defining said axis of rotation projecting lengthwise transversely of said brake cable sections, and said abutments constitute lugs projecting radially of said rod and arranged for selective circumferential abutments with a corresponding one of said clamps.

5. A vehicle as defined in claim 1, wherein said hand lever is removably connectable to said rotatable member and arranged to be removably accessible to the driver of the vehicle.

6. A selective braking assembly as defined in claim 1, wherein said reciprocatively rotatable member defines an axis of rotation thereof, said differential braking links constitute brake cable sections which are attached to said rotatable member for winding and unwinding around the latter upon rotation thereof.

7. A vehicle as defined in claim 1, wherein said pair of brake actuating links constitute a pair of brake actuating cable sections and said pair of differential braking links form a pair of differential actuation cable sections attached to said brake actuating cable sections respectively and to said reciprocatively rotatable member and arranged for winding and unwinding around the latter upon rotation thereof.

\* \* \* \* \*